(12) United States Patent
Amsellem

(10) Patent No.: US 7,845,110 B2
(45) Date of Patent: Dec. 7, 2010

(54) INDIVIDUAL PLANT WATERING DEVICE

(75) Inventor: Maurice Amsellem, Lyons (FR)

(73) Assignee: Aquasolo Systems (FR)

( * ) Notice: Subject to any disclaimer, the term of this patent is extended or adjusted under 35 U.S.C. 154(b) by 0 days.

(21) Appl. No.: 12/723,175

(22) Filed: Mar. 12, 2010

(65) Prior Publication Data

US 2010/0180496 A1  Jul. 22, 2010

Related U.S. Application Data

(63) Continuation of application No. 11/236,295, filed on Sep. 27, 2005, now Pat. No. 7,685,766, which is a continuation of application No. 10/483,369, filed as application No. PCT/FR02/02273 on Jul. 1, 2002, now abandoned.

(30) Foreign Application Priority Data

| Jul. 16, 2001 | (FR) | ................................. 01 09450 |
| Mar. 20, 2002 | (FR) | ................................. 02 03432 |
| Apr. 18, 2002 | (FR) | ................................. 02 04848 |

(51) Int. Cl.
*A01G 29/00* (2006.01)
(52) U.S. Cl. ...................................... 47/48.5
(58) Field of Classification Search ................ 47/48.5, 47/79, 80; *A01G 29/00*
See application file for complete search history.

(56) References Cited

U.S. PATENT DOCUMENTS

| 100,851 A | 3/1870 | Brundage et al. |
| 1,259,423 A | 3/1918 | Madigan |
| 3,381,860 A | 5/1968 | Armour |
| 4,266,813 A | 5/1981 | Oliver |
| 4,310,102 A | 1/1982 | Walter |
| 5,066,286 A | 11/1991 | Ryan |
| 5,253,900 A | 10/1993 | Snyder |
| 5,472,025 A | 12/1995 | Conrad et al. |

(Continued)

FOREIGN PATENT DOCUMENTS

FR  2252806 A  6/1975

(Continued)

OTHER PUBLICATIONS

Office Action in corresponding Japanese Utility Model, Application No. JP 2003-513322, with translation—dated Apr. 24, 2006.

(Continued)

*Primary Examiner*—Rob Swiatek
*Assistant Examiner*—Kristen C Hayes
(74) *Attorney, Agent, or Firm*—Cantor Colburn LLP

(57) ABSTRACT

A fitting consisting of a part made of injected plastic for connecting a water tank and a hollow cone made of porous ceramics, so as to produce a device for dispensing water individually to plants, in particular potted plants, proximate to their roots, and in predetermined amount, comprising three coaxial parts; a disc-shape intermediate part with a central hole; a part consisting of one or two cylinders, arranged on one side of the disc and designed to be permanently fixed to the cone; a part consisting of one or two cylinders bearing a thread on the inner surfaces, arranged on the other side of the disc and capable of receiving a bottle removably screwed.

17 Claims, 5 Drawing Sheets

U.S. PATENT DOCUMENTS

| | | |
|---|---|---|
| 5,617,999 A | 4/1997 | Chiang |
| 5,813,605 A | 9/1998 | Chou |
| 5,873,496 A | 2/1999 | Montaner et al. |
| 5,896,700 A | 4/1999 | McGough |
| 6,128,856 A | 10/2000 | Doan |
| 6,139,534 A | 10/2000 | Niedospial, Jr. et al. |
| 6,183,465 B1 | 2/2001 | Meier et al. |
| 6,216,387 B1 | 4/2001 | Stoller et al. |
| 6,219,963 B1 | 4/2001 | Wang |
| 6,243,986 B1 | 6/2001 | Crowley |
| 6,382,439 B1 | 5/2002 | Belokin et al. |
| 6,402,723 B1 | 6/2002 | Lampropoulos et al. |
| 6,415,937 B1 | 7/2002 | DeJong et al. |
| 6,425,424 B1 | 7/2002 | Ellis Calvo et al. |
| 6,666,345 B2 | 12/2003 | Blanding |
| 6,820,772 B1 | 11/2004 | Bennett, Jr. |
| 7,240,457 B1 | 7/2007 | Chang |
| 2002/0020111 A1 | 2/2002 | Rosenberg |
| 2004/0181999 A1 | 9/2004 | Amsellem |

FOREIGN PATENT DOCUMENTS

| | | |
|---|---|---|
| FR | 2673356 A | 9/1992 |
| JP | 149951 | 10/1979 |

OTHER PUBLICATIONS

International Preliminary Examination Report (IPER) from corresponding International Application No. PCT/FR02/02273.

INDIVIDUAL PLANT WATERING DEVICE

CROSS-REFERENCE TO RELATED APPLICATIONS

This application is a continuation of application Ser. No. 11/236,295, now U.S. Pat. No. 7,685,766, filled on Sep. 27, 2005, which is a continuation of application Ser. No. 10/483, 369, now abandoned, filed Jan. 9, 2004, which, in turn, is the national stage application of International Application No. PCT/FR02/02273 having an international filing date of Jul. 1, 2002, and which claims priority to French application numbers 01/09450 filed Jul. 16, 2001, 02/03432 filed Mar. 20, 2002, and 02/04848 filed Apr. 18, 2002, all of which are incorporated herein by reference.

BACKGROUND OF THE INVENTION

The present invention concerns a fitting permitting the connection a water reservoir and a porous enclosure comprising a ceramic cone which allows water to pass slowly therethrough to continuously and individually supply water to plants, in proximity of their roots, and in predetermined volume, and especially to potted plants. The fitting of the invention is provided with a plurality of different threads to be adaptable to most commercially available plastic bottles, which bottles are utilized as water reservoirs.

The fitting of the invention allows a fully reliable interconnection between the bottle and the porous cone. This feature is essential in view of the fact that the purpose of the device is to maintain plants alive in case of absence, e.g. without surveillance, particularly in rooms (apartments) where flooding must be avoided.

A plurality of devices are known attempting to provide the same result, but these known devices have inconveniences prohibiting their commercial exploitation.

French patent No. 2673356 concerns a cap whose truncated form permits to adapt it to different neck dimensions of bottles on which it is to be installed.

The disadvantages of this device are as follows:
  the engagement between the cone and the neck of the bottle is provided along a single line about the cone and in the interior of the neck, which is insufficient to obtain a safe interconnection of these two parts,
  to obtain tightness, the truncated part must be made of medium-soft plastic material, which, once more, does not permit a safe interconnection between the cone and the bottle.

Consequently, if the bottle is full, it may be driven under the impact of its weight and may become disengaged from the cap. The water can accordingly flow out instantaneously from the bottle causing flooding, thereby making the device inappropriate for use in apartments, and in all cases in which the user relies on the water supply to maintain his plants alive.

Swiss patent No. 391368 concerns another example in which water is contained in a hollow body whose pointed base is forced into the soil. The hollow body serving as reservoir and the portion driven into the soil forming one single unitary non- separable assembly so that it is not intended to use commercially available plastic bottles, thereby making the device cumbersome when it has to be stored.

The U.S. Pat. No. 4,300,309 describes a similar system having the same disadvantages.

The French patent No. 2252806 discloses a similar system with the same inconveniences and in addition, wicks must contribute to the water distribution, thereby making its use less practical as digging is necessary to embed the wicks into the soil, this device being thus designed to remain in the plant pot, which is contrary to the goal looked after which is to provide the device whose use is occasional.

The U.S. Pat. No. 6,128,856 describes an irrigation device comprising a cap having a rotary valve connected on one side to a tube fixed to a dispensing device and on the other side to a bottle adapted to be threaded thereinto. The inconveniences of this known device are
  its complexity, thus its cost;
  the difficulty to provide a suitable control,
  the lack of reliability for a device that can become soil contaminated,
  the need for servicing to maintain performances,
  a single type of bottle that can be threadably engaged therewith, obliging the user to retain the adapted bottle, thus to encumber himself.

U.S. Pat. No. 5,896,700 describes an irrigation device comprising a water reservoir threaded on a device comprising a pointed member adapted to be driven into the soil to allow water to flow thereinto, a filter being interposed therebetween to control the flow. The disadvantage being once more the space occupation and the impossibility to use a large choice of commercially available plastic bottles.

SUMMARY OF THE INVENTION

It can be seen from the hereinbefore described prior art devices that although they provide for watering plants by the provision of a water reservoir and a device to distribute the water, none of them achieves at the same time all of the requirements of the invention, which are to fixedly interconnect a known means, such as a porous cone, normally used for irrigation purposes, with numerous types of plastic bottles that can be thrown away, to obtain a low cost product, adapted to individually water potted plants without surveillance in case of absence of their proprietor, and requiring less space in periods of non-use.

To the contrary, the fitting according to the invention achieves all of these requirements: in effect, in associating a known means, such as porous cone, with a disposable plastic bottle, the device of the invention permits to obtain the following results:
  a bottle adapted to the fitting can be easily found, as the fitting is provided with two or several different thread types,
  the bottle can be fixedly attached to the porous cone from which it can only be separated by unthreading, thereby allowing to leave in full confidence the device filled with water, without surveillance, for example during vacation time,
  the space occupation is very limited: if it is desired to put the device aside after use, for example, if after return from vacation, the proprietor wishes to again water the plant himself, he throws away the bottle and retains only the ceramic cone associated with the fitting, the assembly occupying a very reduced volume, substantially less than previously known devices.
  no adjustment is necessary. It being sufficient to refer to the directions of use to select, within the proposed range, the ceramic cone providing the necessary water flow for the plants concerned. Then the user selects a bottle having a capacity corresponding to the water volume that is necessary for the desired watering duration (for example the duration of the vacation).

finally, the device is of low cost, in that it is a plastic part fabricated by injection of plastic material, affixed to a ceramic cone.

These several advantages have not been achieved with the previously cited prior art devices, however, to the contrary, they are all achieved with the device of the invention.

These advantages are essential for the commercial success of the device. In effect, this device is adapted for individually watering unattended potted plants in case of absence of the proprietor of the plants. Now, it is not seldom for one proprietor to have numerous potted plants (sometimes up to ten or more) and as it is necessary to have as many fittings as plants, this device must be of low cost so that many devices can be purchased, and easily stored when the proprietor returns and again wishes to water the plants himself. It is also essential that all of the needed bottles can be easily found for all of the plants and, lastly, putting in place or installation of the device should be very simple.

The number of previously proposed non-satisfactory devices, for example those disclosed in the previously cited documents shows that the problem was long known.

The defects and the complications inherent to the proposed solutions prove that the problem was difficult to solve and above all proves that it had not been solved in the prior art.

The solution proposed by the invention was thus not obvious in spite of its simplicity and without doubt in view of its simplicity.

In effect, the inventor has devoted five years of full time research to its solution.

Only after having passed through numerous steps, realized hundreds of prototypes, thousands of tests and filed several patent applications, it has been possible, due to a solution that is different from all heretofore existing suggestions to develop a device that perfectly meets the requirements.

To achieve these results, the device according to the invention is a fitting provided on one of its sides with a means for firmly interconnecting the fitting with the base of a porous cone and on the other side with two selectable means for interconnection with the neck of a bottle; each of these two means being adaptable to the thread pitches of standard bottles.

DESCRIPTION OF THE DRAWINGS

The invention will be well understood by reference to the following description and figures, wherein.

DETAILED DESCRIPTION OF THE INVENTION

Figure 1:
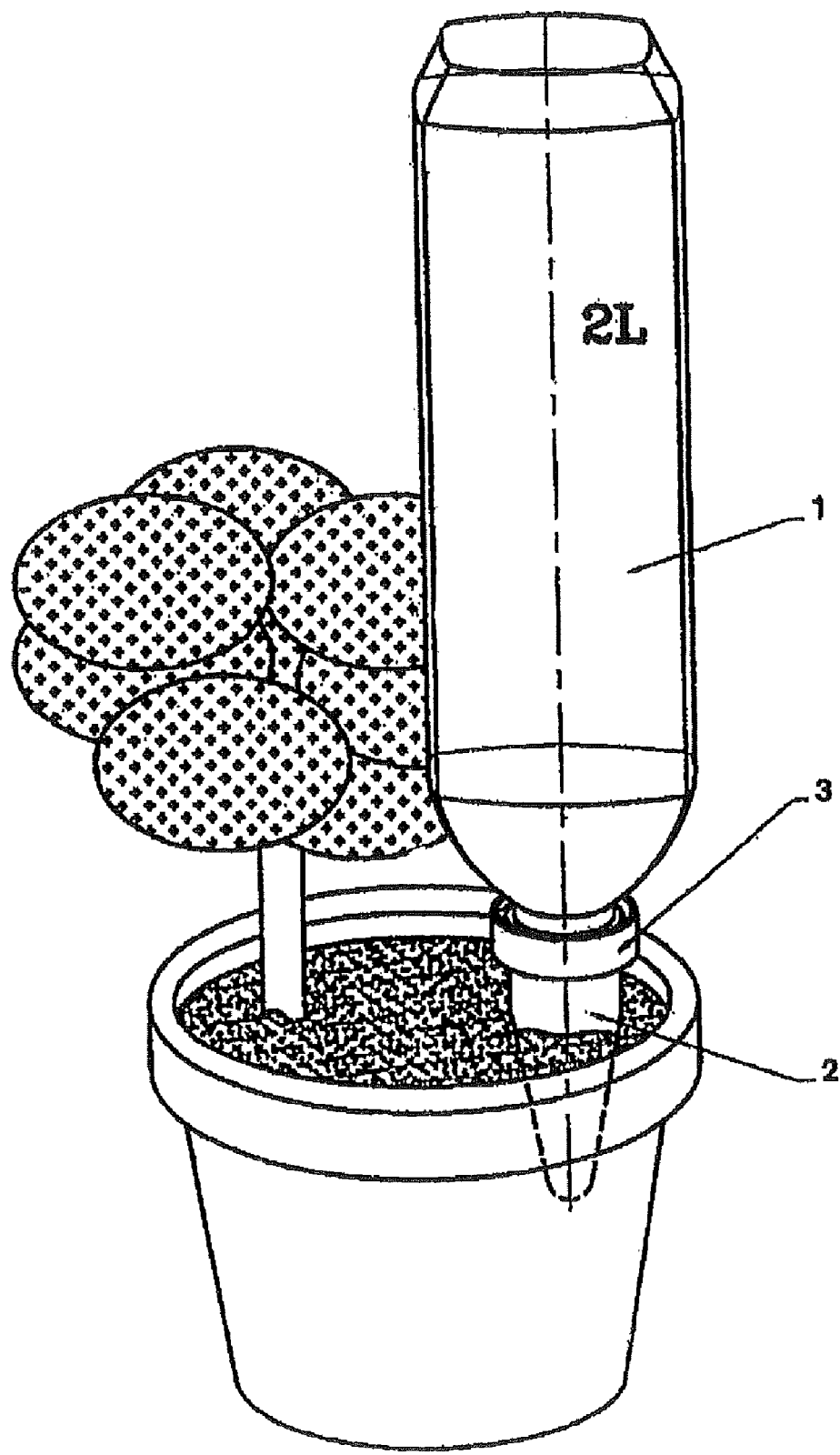
FIG. 1 is a view of the overall irrigation device, comprising a standard plastic bottle (1) and a porous cone (2) assembled by means of a fitting (3) according to the invention, and placed adjacent the root of a plant.

The automatic individual plant watering device comprises a bottle (1) adapted to contain water and a cone (2) firmly attached to one another by means of a fitting (3) which establishes a rigid interconnection therebetween allowing water flow from the bottle (1) into the interior of the cone (2) whose walls are wholly or partly comprised of a porous material which under the effect of the pressure due to gravity allows water to flow slowly therethrough.

The fitting (3), according to the present invention, is a part formed by injection of plastic material and comprises three coaxial portions:
- an intermediate portion (4) in form of a disc, having an aperture (5) at its center,
- a portion (A) arranged on one side of the disc (4) and adapted to be permanently fixed to the porous cone (2), this portion (A) being provided by one or two protruding portions, comprising material comprised between two generally cylindrical surfaces and referred to hereinafter as cylinders,
- a portion (B) arranged on the other side of the disc, this portion (B) being formed, like portion (A), of one or two cylinders; provided with a thread form on the inner surfaces thereof, and adapted to threadably and removably receive a bottle (1).

In the embodiments shown in the figures the hollow cone (2) is of porous material, such as ceramic material. In addition, as seen, the cylinders of portion A are unthreaded.

The base of the cone (2) is prolonged by a hollow cylindrical portion (6) adapted to be fixed to the portion (A) by fitting one within the other.

In a first embodiment shown in FIGS. 2, 3, 4 and 5, the portion (A) comprises two coaxial cylinders (8) and (7) unitary with the disc (4) at one of their ends:
- the cylinder (8) whose external diameter is equal to the internal diameter of the cylindrical portion (6) of the cone and is adapted to be introduced into this portion (6) of the cone,
- the cylinder (7) whose internal diameter is equal to the external diameter of the cylindrical portion (6) of the cone, and is adapted to be fitted on this portion (6) of the cone.

The cylinder (8) having the smallest diameter has an interior diameter equal to or larger than the diameter of the aperture (5).

For assembly, the portion (6) of the cone is forcefully pressed into the space (9) comprised between the two cylinders (8) and (7) until its edge (12) comes into contact with the portion (10) of the disc (4) between the two cylinders. Thus, a sufficiently tight engagement is obtained so that possible leakage in comparison with the flow through the porous cone is negligible.

To facilitate introduction of the cone between the two cylinders, it is preferable for one of the two cylinders to be shorter than the other, and preferably that the cylinder (8) is shorter than the cylinder (7). The cylinder (8) may have a length for example of one third of the cylinder (7). Thus, on assembly of the two parts (2) and (3), the portion (6) of the cone is positioned so that it is first received within the interior of the cylinder (7) which serves as a means to guide it towards the space (9) whereinto it enters until its end (12) reaches the bottom (10) of this space.

In the preferred embodiment of the invention, the walls of the two cylinders do not have the same thickness, for example the wall of the cylinder (8) is less thick than the wall of the cylinder (7), and is sufficiently thin to have a certain flexibility, suitable to facilitate forceful introduction of the portion (6) of the cone into the interior of the space (9).

As a non-limiting example one particular form of the invention will now be described.

Figure 5:
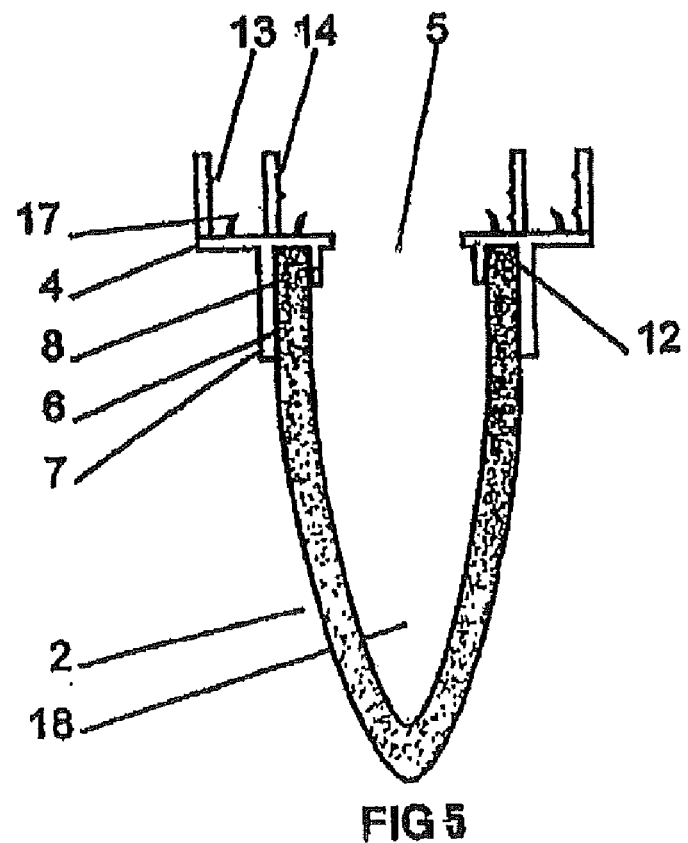
FIG. 5 shows the same fitting in sectional view, associated with the base of the cone of porous material.

The cone shape as shown in cross section in FIG. 5 is selected. The cone has a length of about 70 mm and is provided with a slightly rounded tip. It is composed of a wall having a thickness of about 5 mm, the interior (18) being empty. The cone is prolonged at its base by a cylindrical hollow portion (6) having a length of about 17 mm and a wall thickness of about 5 mm, its exterior diameter being approximately 33 mm and its interior diameter approximately 23 mm, and presenting the rounded edge at its extremity (12).

A fitting (3) is formed by PVC injection, whose portion (A) comprises a cylinder (7) with an internal diameter of approximately 32.5 mm and a cylinder (8) with an external diameter of approximately 23 mm.

The cylinder (7) has a length of about 15 mm and the cylinder (8) has a length of about 5 mm.

The wall of the cylinder (7) has a thickness of about 1.2 mm thereby providing it with a sufficient rigidity so that the interconnection between the fitting (3) and the cone (2) will have an appropriate resistance, while the wall of the cylinder has a thickness of only about 0.8 mm thereby providing sufficient flexibility thereto to permit a given expansion to the space (9), necessary to accept a thickness tolerance of the cone portion (6).

The cylinder (7) may be provided on its internal face, adjacent its free edge, with a circular bead (16) having a thickness of about 0.3 mm for safely gripping the cone portion (6) to ensure a good retention and improve the tightness.

The cylinder (8) may be of variable thickness, for example its internal diameter may decrease approximately 0.3 mm from its end integral with the disc (4) and up to its free edge. The internal face of the cylinder (8) then has a slightly conical form with its base thicker and stronger than its free edge which is thinner and thus more flexible.

The purpose of this alternate embodiment is to permit the edge (12) of the cone portion (6) to be properly positioned at the inlet of the space (9), and to be introduced thereinto by displacing the reduced thickness edge, to finally position itself at the bottom of the space (9) wherein it is safely clamped by the most rigid portion of the cylinder (8).

The assembly of the cone and fitting (3) can be effected by means of a special device comprising a horizontal surface onto which the fitting (3) is placed with the side (A) oriented upwardly. A tool provided with a cavity complementary to the cone form is fixed to the stand of a drilling machine and a cone is placed in the tool cavity with its opening facing downwardly. By lowering the tool, the rounded edge (12) of the portion (6) engages the extremity of the cylinder (7), whereinto it begins to penetrate due to its rounded edge. When penetration of the edge (12) continues and reaches the elevation of the cylinder (8), the cylinder (8) properly enters into the interior of the portion (6) due to the rounded edge of the portion (6) and due to the relative elasticity of the end of the cylinder (8) and the portion (6) continues to effect its forceful penetration into the interior of the fitting (3) until it completely occupies the space (9).

Figure 6:
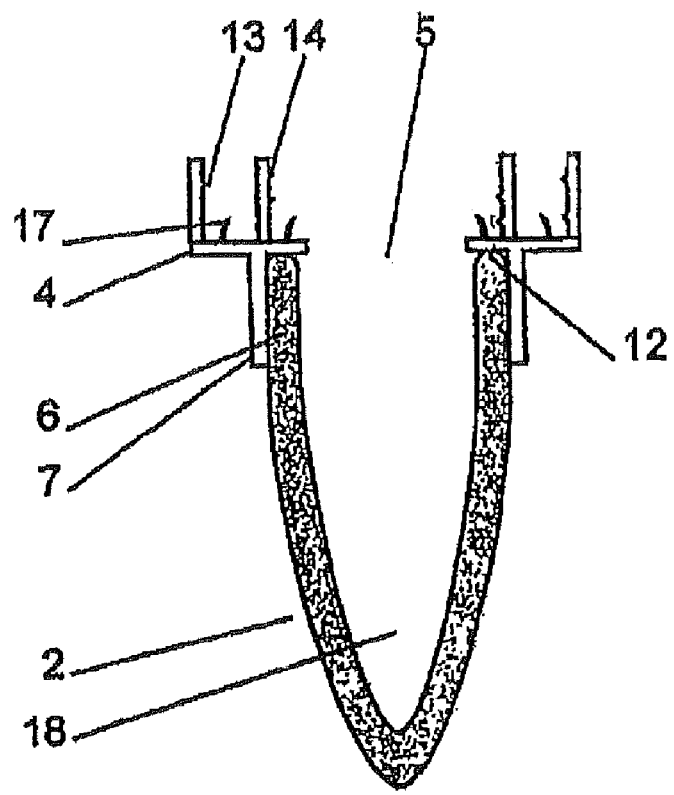
FIG. 6 shows another embodiment of the fitting (3) in cross section and associated with a cone.
Figure 7:
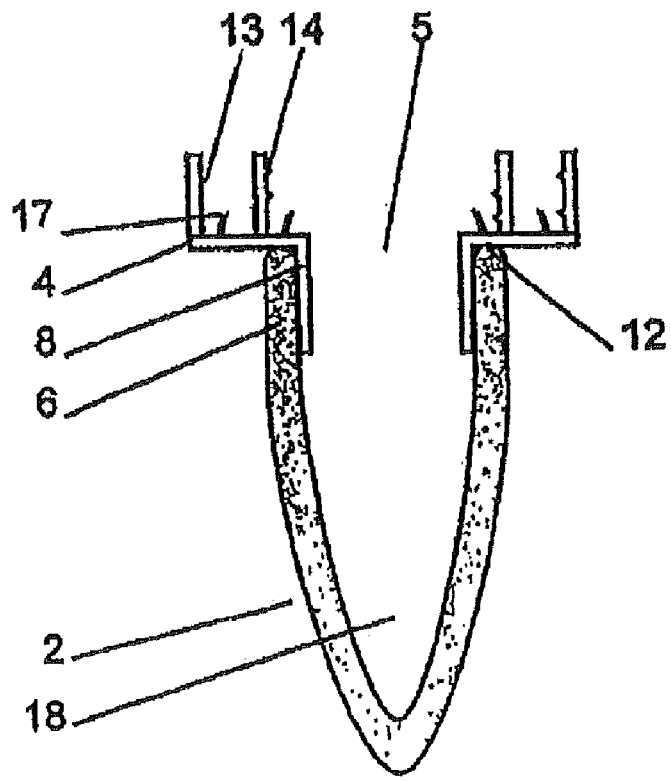
FIG. 7 shows another embodiment of the fitting (3) in cross section and associated with a cone.

In a second embodiment shown in FIGS. 6 and 7, the portion (A) consists of a single cylinder:

a cylinder (7), into the interior of which the cone portion (6) is introduced (FIG. 6), or a cylinder (8) adapted to be introduced into the interior of the cone portion (6) (FIG. 7).

In all of the previously mentioned cases, the diameters of the cylinders (7) and (8) are formed so that there is no space between the wall or the walls of the cone portion (6) and the wall or the walls of the cylinder or cylinders (7) and/or (8).

The portion (B) of the fitting (3) comprises one or two cylinders, preferably coaxial with all of the remaining parts of the fitting, integral at one of the their extremities with the intermediate disc (4), and each having an interior threaded surface. This or these female threads are adapted to cooperate with exterior threads of the bottles used as reservoirs (1).

The fitting (3) shown in the figures comprises two different threads, namely a thread (13) and a thread (14).

The thread (13), of large diameter permitting the use of large bottles, for example five liter bottles; in this case the thread (14) is not used.

The thread (14), of smaller diameter permitting the use of a 1.5 liter bottle; in this case the thread (13) is not used.

There may be provided at the end of each thread a shoulder which is engageable by the end of the neck of the bottle (1).

But a better tightness is obtained by any known sealing means normally provided for the caps of plastic bottles, such as a conical circular lip (17) adapted to be engaged by the bottle neck.

Figure 8:
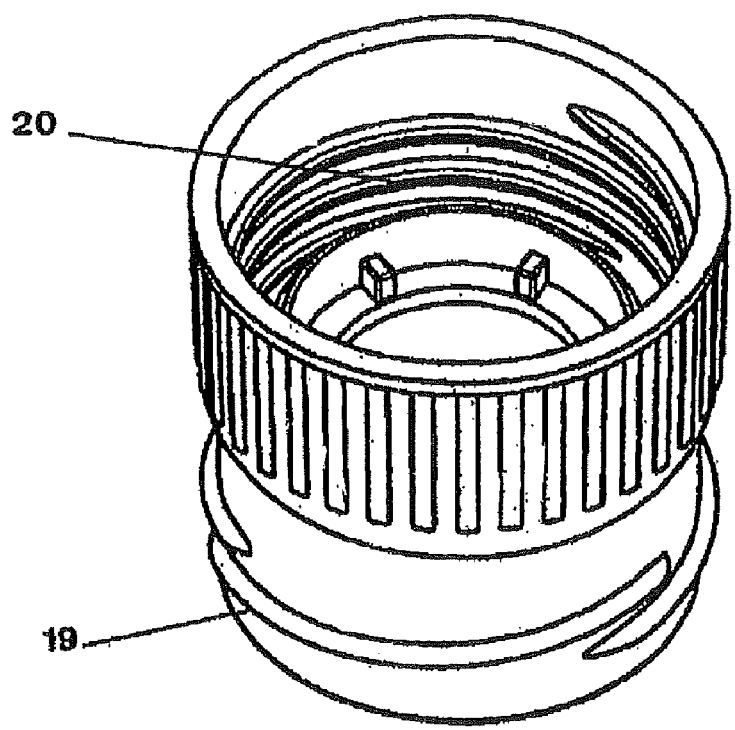
FIG. 8 shows an adaptor.
Figure 2:
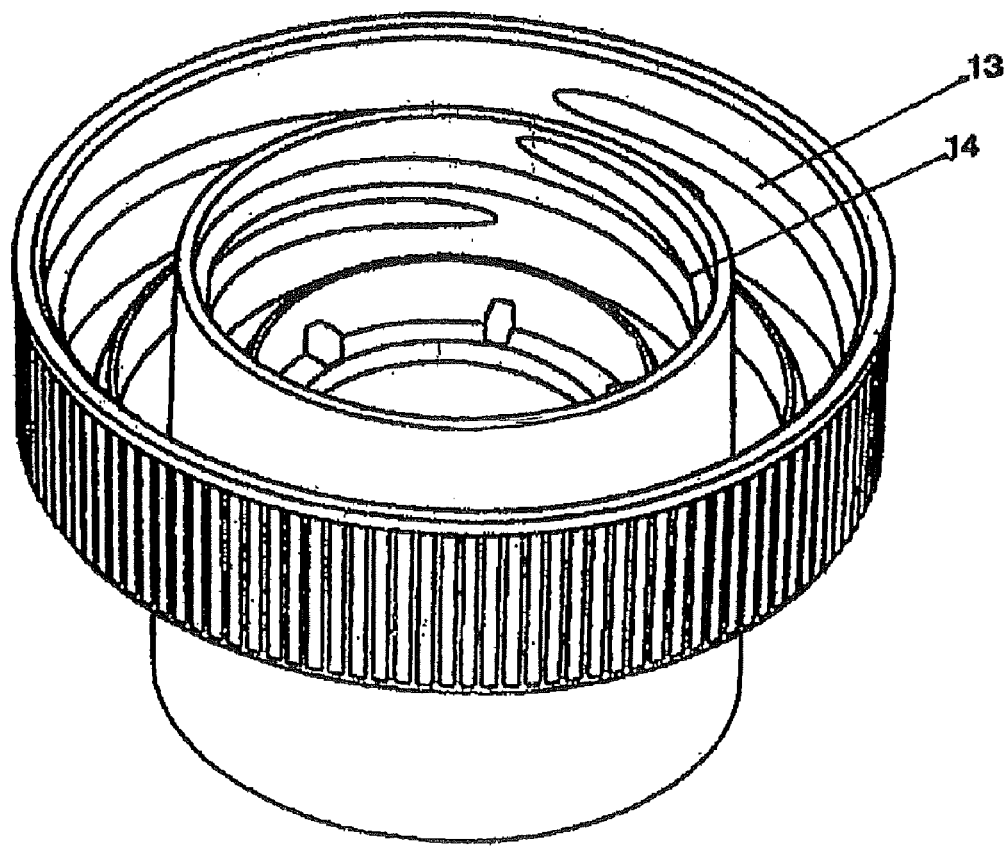
FIG. 2 shows one embodiment of the fitting (3), in top plan view and comprising two thread dimensions adapted to mate with two bottle thread dimensions.
Figure 3:
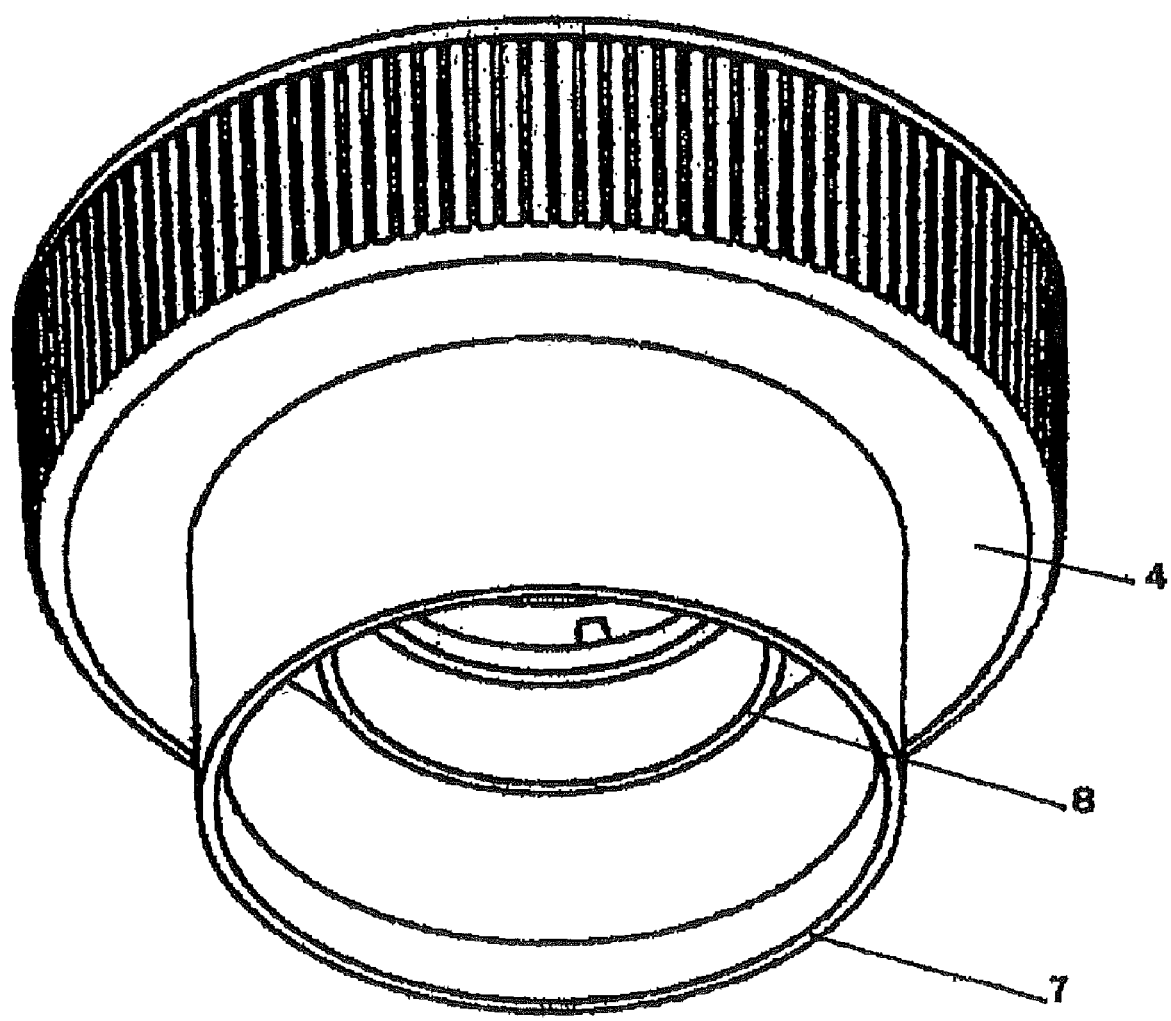
FIG. 3 shows the same fitting from below.
Figure 4:
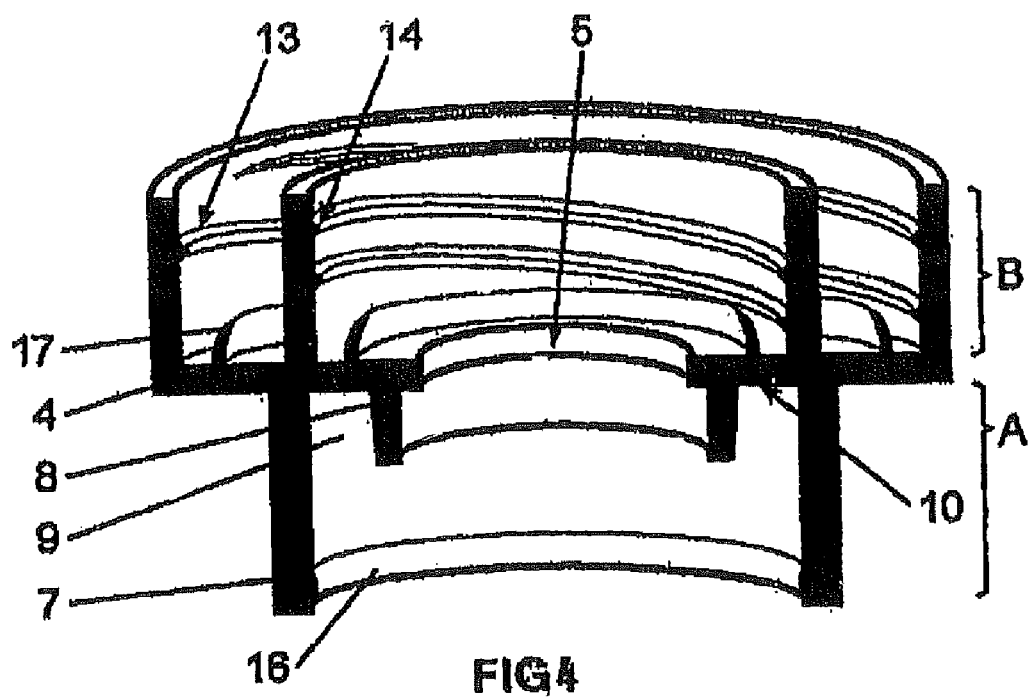
FIG. 4 shows the same fitting cut in a plane passing through its axis.

To increase the number of thread forms usable with the fitting (3) an adapter can be added comprising a threaded male sleeve (19) compatible with one of the two threads of the fitting (3), as would be the neck of the bottle, and having at its other end a different female thread (20). This adapter is shown in FIG. 8.

The use of the device according to the invention as described in the preceding examples is particularly simple:

The user retrieves a disposable plastic bottle and fills it with water;

He threadably engages the fitting (3) provided with a cone (2) with the bottle;

He inverts the assembly so that the cone is at the lower end thereof and then forces the cone into the soil adjacent the root of the plant to be watered.

The device is thus maintained in substantially vertical position, and with the use of a needle he forms a small hole at the upper end of the bottle, which is the bottom thereof, to permit air to enter into the bottle.

For example, three cone (2) types of ceramic material can be provided furnishing three different main water supplies: 7 cl per 24 h, 20 cl per 24 h and 30 cl per 24 h.

To water for example an ivy or a zinnia a water flow of 7 cl per 24 h is sufficient and with a bottle of 1.5 liters the plant can be watered during 21 days.

To water for example a fuchsia or a begonia a water flow of 20 cl per 24 h permits with a 2 liter bottle to furnish sufficient water volume for 10 days (a bottle of 5 liters at 20 cl per 24 h would last 25 days).

To water for example an azalea or a wandering-jew a water flow of 30 cl per 24 h permits with a 5 liter bottle to provide during 16 days a sufficient water volume.

Tests have been made with the devices according to the invention.

With a 1.5 liter bottle and a ceramic cone of 7 cl per 24 h it has been possible to provide a continued water supply to a zinnia pot during 21 days. The plant has survived in good health.

With a bottle of 5 liters of water and a ceramic cone of 20 cl per 24 h it has been possible to furnish a sufficient water supply to a fern pot during 25 days. The plant has survived in good health.

The present invention can be utilized in any case where it is desired to safely furnish a continuous water supply during a predetermined time period that is known in advance.

The present invention is particularly useful for maintaining unattended plants in good health during absence of the person who normally waters the plants.

On the other side, although of the device of the invention can be utilized for permanently watering plants, the device of the invention is not thought for such use.

In the preceding description reference has been made to the use of a part (2) in form of a cone, but it is to be understood that any other form capable of being inserted into the soil and to permit water to be dispensed slowly therethrough would be within the scope of the present invention.

Additionally, as an example of porous material, a ceramic material has been referred to, but it is to be understood that any other porous material permitting water flow therethrough at different desired rates is comprised within the scope of the present invention.

I claim:

1. A plant watering device comprising:
   a porous cone formed from a porous material; said porous cone having a base defining a circumferential wall; and
   a fitting; said fitting comprising:
   an intermediate portion in form of a disc having an aperture at its center; said disc having a first surface and a second surface, the first and second surfaces being on opposite sides of said disc;
   a first portion including at least one unthreaded cylinder extending from the first surface of said disc; said at least one unthreaded cylinder and said base of said cone having respective diameters such that said cone is frictionally secured to said unthreaded cylinder; and
   a second portion including a first internally threaded cylinder and a second internally threaded cylinder, said first and second internally threaded cylinders extending from the disc second surface; said first and second internally threaded cylinders being concentric with each other, the threaded cylinders being sized and the threads of said threaded cylinders being shaped such that said threaded cylinders can be threadedly connected to commercially available bottles of different bottle opening diameters, the second portion including first sealing means disposed between the first threaded cylinder and the second threaded cylinder, the first sealing means being shaped to engage and form a seal with a bottle having an opening formed with a first diameter, and second sealing means disposed between the second threaded cylinder and the aperture, the second sealing means being shaped to engage and form a seal with a bottle having an opening formed with a second diameter.

2. The plant watering device of claim 1 wherein said cone base has an internal diameter and said at least one unthreaded cylinder has an outer diameter such that said cone base frictionally fits about said at least one unthreaded cylinder.

3. The plant watering of claim 2 wherein the at least one unthreaded cylinder has on its internal surface, adjacent its free edge, a circular bead.

4. The plant watering device of claim 1 wherein said cone base has an outer diameter and said at least one unthreaded cylinder has an inner diameter such that said cone base frictionally received in said at least one unthreaded cylinder.

5. The plant watering device of claim 1 wherein said first sealing means includes a first lip on said disc second surface; said first lip being sized and shaped to engage and form a seal with a bottle having an opening formed with a first diameter.

6. The plant watering device of claim 1 wherein said second sealing means includes a second lip on said disc second surface; said second lip being sized and shaped to engage and form a seal with a bottle having an opening formed with a first diameter.

7. The plant watering device of claim 1 wherein said first portion comprises a second unthreaded cylinder; said first and second unthreaded cylinders being concentric with each other and defining an annular gap sized to receive the circumferential wall of said cone.

8. The plant watering device of claim 7 wherein the first and second unthreaded cylinders do not have the same length.

9. The plant watering device of claim 7 wherein one of the first and second unthreaded cylinders has a length which is about one third the length of the other of the first and second unthreaded cylinders.

10. The plant watering device of claim 7 wherein the walls of the first and second unthreaded cylinders do not have the same thickness.

11. The plant watering device of claim 10 wherein one of said first and second unthreaded cylinders comprises an inner cylinder, said inner cylinder being sufficiently thin so as to have a certain resiliency, appropriate to facilitate forceful introduction of the cone base into the annular gap delimited between the first and second unthreaded cylinders.

12. The plant watering device of claim 7, characterized in that the one of the first and second unthreaded cylinders is of variable thickness.

13. The plant watering device of claim 12 wherein the one of the first and second unthreaded cylinders has a wall with an external diameter, the wall of said unthreaded cylinder having an end that is integral with the disc and a free edge, the external diameter of said wall decreasing approximately 0.3 mm from the end that is integral with the disc towards the free edge thereof, said unthreaded cylinder having an external face thereby being provided with a slightly conical shape with its base being thicker, and thus more rigid, than its free edge, which is thinner and thus more flexible.

14. The plant watering device of claim 1 including an adapter; said adapter defining a hollow passage and having a first externally threaded end sized to be received by one of the internally threaded cylinders of said fitting second portion, and an internally threaded second end, said second end being sized, and the threads being shaped, such that said adapter second end can be threaded on to a commercially available bottle.

15. A plant watering device comprising:
   a porous tip portion having a hollow base, the hollow base having an inner surface and an outer surface; and
   a fitting; said fitting comprising:
   an intermediate portion in form of a disc having an aperture at its center; said disc having a first surface and a second surface, the first and second surfaces being on opposite sides of said disc;
   a first portion including a first unthreaded member and a second unthreaded member extending from the first surface of said disc; said first and second unthreaded members defining an annular space that is sized to receive the hollow base of the porous tip portion; and
   a second portion including a first internally threaded cylinder and a second internally threaded cylinder, said first and second internally threaded cylinders extending from the disc second surface; said first and second internally threaded cylinders being concentric with each other, the threaded cylinders being sized and the threads of said threaded cylinders being shaped such that said threaded cylinders can be threadedly connected to commercially available bottles of different bottle opening diameters, the second portion including first sealing means disposed between the first threaded cylinder and the second threaded cylinder, the first sealing means being shaped to engage and form a seal with a bottle having an opening formed with a first diameter, and second sealing means disposed between the second threaded cylinder and the aperture, the second sealing means being shaped to engage and form a seal with a bottle having an opening formed with a second diameter.

16. The plant watering device of claim 15 wherein one of said first portion unthreaded members is shorter than the other of said first portion unthreaded members.

17. The plant watering device of claim 15 wherein one of said first portion unthreaded members has a wall which varies in width, said wall being narrower at a free end thereof than at a base of said wall; said unthreaded member is sufficiently thin, at least at its said free end, so as to have a certain resiliency, appropriate to facilitate forceful introduction of the hollow base into the interior of the space delimited between the first portion unthreaded members.

* * * * *